United States Patent [19]

Philippe et al.

[11] Patent Number: 4,768,628
[45] Date of Patent: Sep. 6, 1988

[54] SHOCK ABSORBER FOR A SUSPENSION ELEMENT OF A HEAVY VEHICLE

[75] Inventors: Joseph Philippe, Carpentras; Jean-Michel Perrochat, Montrouge, both of France

[73] Assignee: S.A.M.M. - Societe d'Applications des Machines Motrices, Bieveres, France

[21] Appl. No.: 24,100

[22] PCT Filed: Jun. 10, 1986

[86] PCT No.: PCT/FR86/00200
§ 371 Date: Feb. 6, 1987
§ 102(e) Date: Feb. 6, 1987

[87] PCT Pub. No.: WO86/07422
PCT Pub. Date: Dec. 18, 1986

[30] Foreign Application Priority Data

Jun. 10, 1985 [FR] France ................. 85 08756

[51] Int. Cl.[4] ............................................. F16F 9/50
[52] U.S. Cl. ........................ 188/302; 188/322.14; 267/64.11; 280/705
[58] Field of Search ............. 188/302, 322.13, 322.14, 188/297, 305; 267/64.11, 64.13, 64.15, 64.18; 280/705, 714

[56] References Cited

U.S. PATENT DOCUMENTS

| 3,459,439 | 8/1969 | Sinclair et al. | 280/124 |
| 3,614,125 | 10/1971 | Sinclair | 280/124 |
| 4,153,237 | 5/1979 | Supalla | 267/64.15 |
| 4,156,536 | 5/1979 | Brandstadter | 280/705 |
| 4,552,344 | 11/1985 | Johnson | 92/156 |

FOREIGN PATENT DOCUMENTS

| 2139942 | 11/1972 | Fed. Rep. of Germany . |
| 2230975 | 12/1972 | Fed. Rep. of Germany . |
| 3332292 | 3/1987 | Fed. Rep. of Germany ............. 188/322.15 |
| 2404772 | 4/1979 | France . |
| 1250216 | 10/1971 | United Kingdom . |
| 2011020 | 7/1979 | United Kingdom . |
| 2093155 | 8/1982 | United Kingdom . |

Primary Examiner—Douglas C. Butler
Assistant Examiner—Matthew C. Graham
Attorney, Agent, or Firm—Sughrue, Mion, Zinn, Macpeak, and Seas

[57] ABSTRACT

A shock absorber having a hollow slide slidably mounted in a fixed member disposed in a sleeve inside the body, separated from the latter by an annular gap and having an opening which communicates with a conduit opening into an a hydraulic chamber. The fixed member is mounted with clearance in the sleeve and is provided with radial ports communicating with the interior of the slide which is biased against the fixed member by an elastic return member bearing on the body. The slide is arranged in such manner as to be capable of occupying alternately a first position, in which it closes any communication between the annular gap and the interior of the slide when the suspension element is subjected to a low frequency oscillation less than $\sqrt{2}$ times its frequency of resonance, and a second position in which it establishes a communication between its interior volume and the annular gap between the sleeve and the body when the suspension element is subjected to an oscillation frequency greater than its frequency of resonance.

4 Claims, 4 Drawing Sheets

SHOCK ABSORBER FOR A SUSPENSION ELEMENT OF A HEAVY VEHICLE

The present invention relates to a shock absorber for a suspension element of a heavy vehicle.

This suspension element is of the type of those described in French patent applications No. 85 05 064, now French patent No. 2579936, and No. 85 05 067 now French patent No. 2579935 filed on Apr. 3, 1985 by the Applicant.

These patent applications describe a suspension element comprising an arm through which extends a wheel stub-axle of the vehicle, and rotatively articulated on a fixed part connected to the chassis of the vehicle, with interposition of rolling means between this fixed part and the rotary arm. A hydraulic chamber is provided in the arm and contains a slidable piston on which is articulated a link whose end opposed to the piston is articulated to the fixed part, the latter having an interior volume concentric with the axis of the fixed part connected to the chassis of the vehicle. More particularly, patent application No. 85 05 064 describes a ground clearance corrector adapted to be placed in the aforementioned interior volume so as to constantly control the ground clearance of the chassis of the vehicle at a pre-set value, irrespective of the profile of the ground over which the vehicle travels.

This suspension element comprises a shock absorber communicating on one hand with a hydraulic chamber of the piston and on the other hand with hydraulic chambers separated from gas chambers by two freely slidable pistons.

It is therefore to this shock absorber that the present invention relates.

According to the invention, the shock absorber comprises a hollow slide slidably mounted in a fixed member disposed in a sleeve inside the body, separated from the latter by an annular gap and having an opening which communicates with a conduit opening into the hydraulic chamber, the fixed member is mounted with clearance in the sleeve and provided with radial ports communicating with the interior of the slide, which is biased against said fixed member by an elastic return member bearing on the body, the slide being arranged in such manner as to be capable of occupying alternately a first position in which it closes any communication between said annular gap and the interior of the slide when the suspension element is subjected to a low frequency oscillation, less than $\sqrt{2}$ times its frequency of resonance, and a second position in which it establishes a communication between its interior volume and the annular gap between the sleeve and the body when the suspension element is subjected to an oscillation frequency greater than its frequency of resonance.

Under these conditions, when the frequency of oscillation or excitation of the wheel associated with this suspension element is low, the slide remains closed, the force and the displacement transmitted to the suspension element are large, and the shock absorption is high.

On the other hand, when the oscillation frequency of the wheel is sufficiently high and the forces transmitted to the suspension are sufficiently large, the slide is opened and remains open so that the shock absorption obtained is low. In other words, the vehicle then does not undergo large vertical displacements.

Further features and advantages of the invention will be apparent from the following description with reference to the accompanying drawings which illustrate an embodiment by way of a non-limiting example:

FIG. 1 shows a suspension element for a heavy vehicle similar to that described in the aforementioned French patent application No. 85 05 067.

Figure 1:
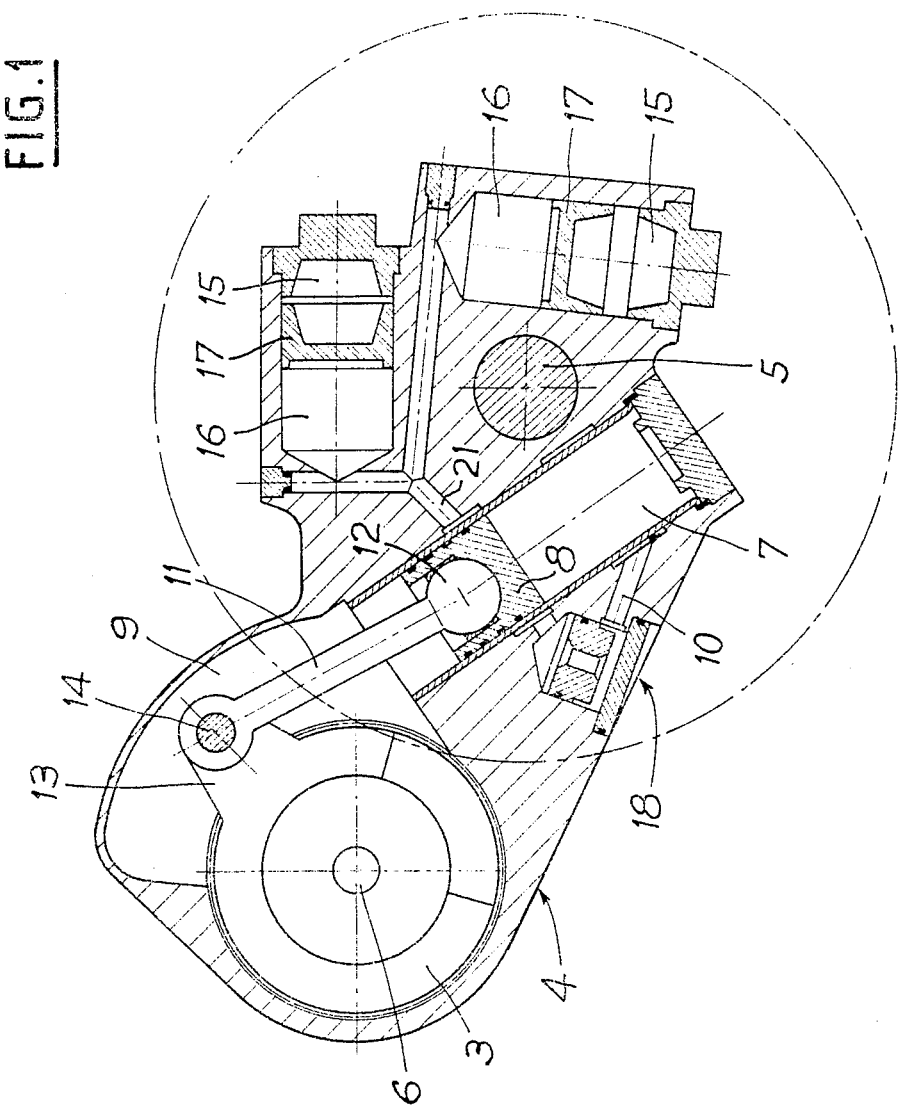
FIG. 1 is a longitudinal sectional view with a partial elevational view of an embodiment of the suspension element in which the shock absorber to which the invention relates may be mounted.

This suspension element comprises an arm 4 through which extends a wheel stub-axle 5 (the wheel not being represented), and which is rotatively articulated on a fixed part 3 which is coaxial with a shaft 6 connected to the chassis (not shown). A hydraulic chamber 7 is provided in the arm 4 and contains a slidable piston 8 which separates the chamber 7 from a cavity 9. A link 11 is articulated on one hand in the piston 8 by a ball joint 12 and on the hand by a pin 14 on a lug 13 connected to the fixed part 3. The arm 4 is also provided with two gas chambers 15 each separated from a hydraulic chamber 16 by two freely slidable pistons 17 and is provided with a shock absorber 18 connected on one hand to the hydraulic chamber 7 through a passageway 10 and on the other hand to the two hydraulic chambers 16 through a passageway 21.

These various elements, except for the shock absorber 18, and their hydraulic supply circuit are described in detail in the above patent application so that their description and their operation will not be repeated here.

Figure 2:
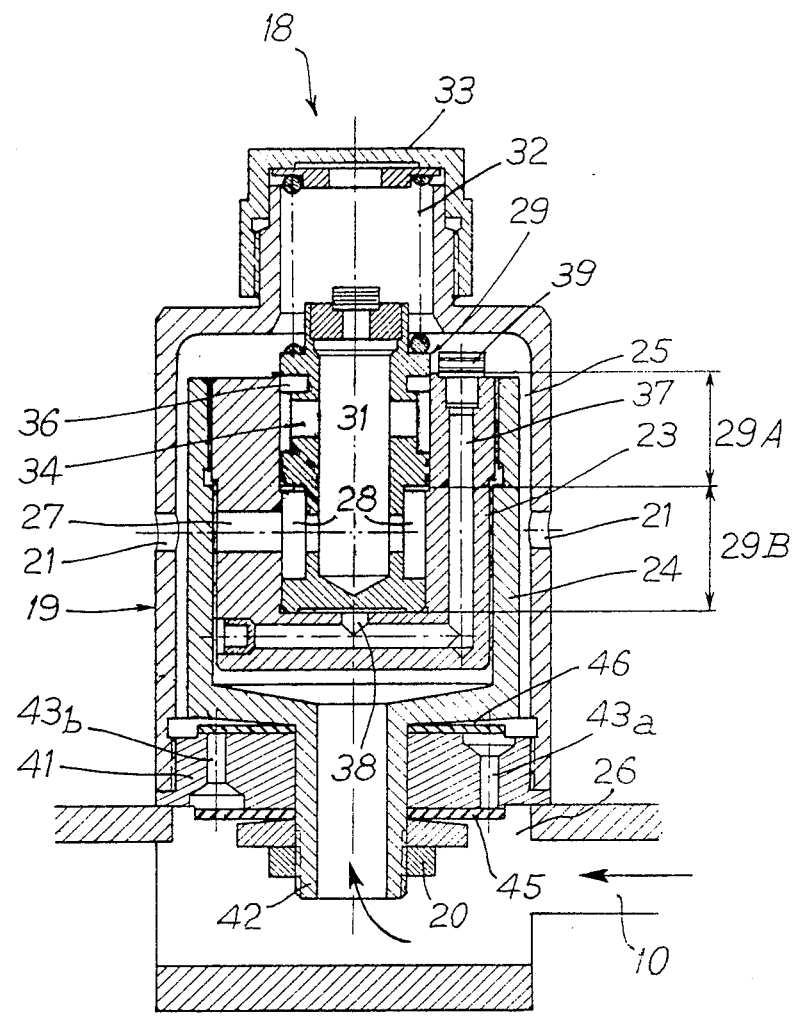
FIG. 2 is an axial sectional view of an embodiment of the shock absorber according to the invention, the slide being closed.

There will now be described with reference more particularly to FIGS. 2 to 4 an embodiment of the shock absorber 18 to which the invention relates.

The shock absorber 18 comprises a hollow body 19 which has a cylindrical part provided with a series of ports 21 and contains a fixed member 23 disposed in a sleeve 24 inside the body 19 and separated from the latter by an annular gap 25.

The body 19 has an opening 26 which communicates with the conduit 10 opening into the hydraulic chamber 7, and the fixed member 23 is mounted in the sleeve 24 with clearance. Radial ports 27 are provided in the fixed member 23 and are extended by openings 28 provided in a hollow slide 29 axially slidably mounted in the fixed member 23. The openings 28 open into the interior volume 31 of the slide 29 which is biased against the inner end of the fixed member 23 by a return spring 32 of which one end bears itself against the end part 33 of the body 19.

The wall of the slide 29 is provided with other ports 34 which enable the hydraulic liquid to travel from the interior volume 31 into an annular groove 36 formed in the end of the slide 29 adjacent to its return spring 32.

Provided in the fixed member 23 is a passageway 37 opening at one end into a bore 38 of the member 23 arranged in confronting relation to the end of the slide 29 opposed to the spring 32, while the other end of the passageway 37 is provided with a jet 39 with optionally a re-supply by-pass.

The cross-section of the part 29A of the slide 29 the closest to the return spring 32 and on whose surface acts the excitation pressure $P_1$ coming from the hydraulic chamber 7, as will be explained in more detail hereinafter, is slightly larger than the cross-section of the part 29B of the slide 29 on whose surface is exerted the hydraulic pressure $P_0$ transmitted through the jet 39, the passageway 37 and the bore 38. (see the cross-sectional views of FIGS. 2 and 3.)

The body 19 is closed by a plate 41 through which extends centrally an axial tubular extension 42 of the sleeve 24 which opens into the passageway 10. The plate 41 is also provided with orifices 43a, 43b associated with two stacks of elastic washers 45 and 46 maintained by a nut 20. In the known manner, the orifice 43b is so adapted as to allow the hydraulic fluid to enter the orifice 43b when the piston 8 is driven into the chamber 7, which raises the second washer 46 mounted at the opposite end of the orifice 43b so that the hydraulic fluid enters the annular gap 25.

Inversely, the washer 46 associated with the orifice 43a is disposed between the plate 41 and the sleeve 24 and arranged in a similar manner to the washer 45 to allow the passage, upon release, of the hydraulic fluid from the annular gap 25 into the orifice 43a, this hydraulic fluid thereafter flowing between the end of the orifice 43 and the deformable washer 45 to the passageway 10.

The shock absorber 18 just described operates in the following manner.

When the suspension element is subjected to a low oscillation frequency, lower than its frequency of resonance, the increase in the hydraulic excitation pressure $P_1$ prevailing in the interior 31 of the slide 29 (the hydraulic fluid being able to enter the slide 29 owing to the clearance provided between the fixed member 23 and the sleeve 24), is insufficient to shift the slide 29 away from the inner end of the member 23 against the opposing return force of the spring 32. The slide 29 therefore remains in its position illustrated in FIG. 2 where it closes any communication between the annular gap 25, on one hand, and the groove 36, the ports 34 and the interior volume 31 on the other hand. The hydraulic liquid then flows through the orifices 43b, moves away the washer 46 and enters the annular gap 25, and then issues from the body 19 through the ports 21. The shock absorption is therefore large, as is the vertical displacement of the suspension element and consequently the vehicle.

On the other hand, when the excitation or oscillation frequencies are higher than the frequency of the resonance of the element, i.e. when the suspension element undergoes rapid changes when the vehicle travels over a close succession of bumps and recesses on uneven ground and there results a first stress which is sufficiently violent, this stress produces an increase in the differential pressure prevailing in the interior volume 31 which causes the slide 29 to move away from the inner end of the fixed member 23 in opposition to the force exerted by the return spring 32. Indeed, the major part of the hydraulic liquid does not have sufficient time to flow through the orifices 43a owing to the high frequency of oscillation and therefore enters the slide 31 through the tubular end 42 and the gap between the fixed member 23 and the sleeve 24. Further, the layer of hydraulic liquid supplied by the jet 39 between the inner end of the member 23 and the end of the part 29B of the slide 29, retards the displacements of the latter which consequently remains open if the pressure variations are sufficiently brief (high oscillation frequency).

Figure 3:
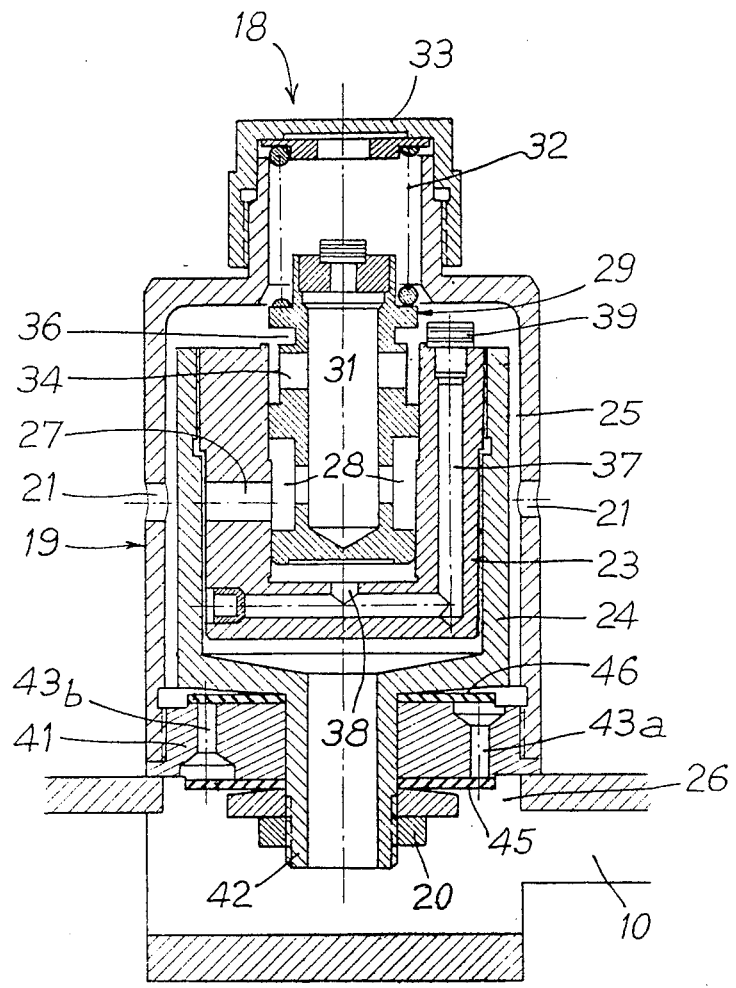
FIG. 3 is a view similar to FIG. 2 showing the shock absorber with its slide open.

The major part of the hydraulic liquid is then bypassed through the interior of the slide 29 which assumes its position of FIG. 3 and which communicates with the annular gap 25. The hydraulic liquid therefore flows essentially through the interior of the slide 29, the annular gap 25 and the lateral ports 21 and the equivalent shock absorption is low.

The operation of the shock absorber may be optimized by suitable adjustments of the jet 39 and of the spring 32.

Figure 4:
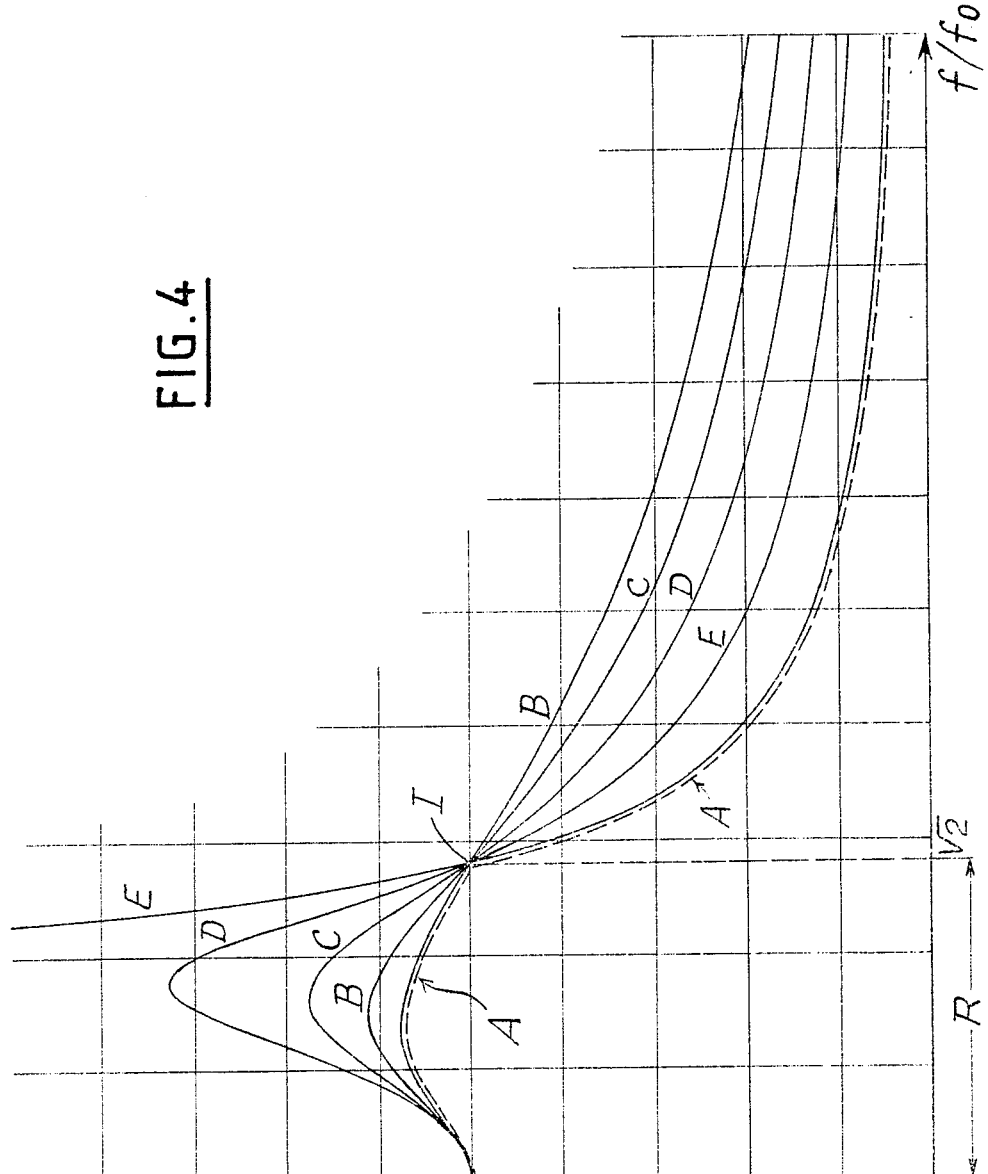
FIG. 4 is a diagram illustrating the variation of the shock absorption as a function of the frequency of oscillation transmitted to the suspension element and to its shock absorber.

The diagram of FIG. 4 illustrates this operation:

The ratio of the excitation frequency f to the specific frequency $f_o$ of the suspension element is plotted as abscissae, and the ratio $D_t/D_e$ of the displacement $D_t$ transmitted to the suspension element, to the excitation displacement $D_e$ (displacement of the wheel associated with the suspension element).

Each of the curves A, B, C, D, E passes through a point I located at $f/f_o = \sqrt{2}$ on the abscissa axis and at $D_d/D_e = 1$ on the ordinate axis, the curve desired being A. Indeed, it can be seen that the part of the curve A located between the abscissae O and $\sqrt{2}$, which the slide 29 is closed, corresponds to displacements of minimum amplitude of the suspended mass for slow stresses and a large shock absorption.

On the other hand, the part of the curve A located beyond the point I of $\sqrt{2}$ on the abscissa axis, in which the slide 29 is open and the shock absorption small resulting from the flow of the hydraulic liquid principally through the interior of the slide 29, corresponds to small displacements of the suspension element and of the chassis of the vehicle for rapid excitation fluctuations.

The shock absorbing factor is therefore high for low excitation frequencies and low for excitation frequencies higher than $\sqrt{2}$ the frequency pertaining to the suspension element. In other words, the displacement of the suspended mass is minimized by the shock absorber according to the invention for any excitation frequency. The invention is not limited to the described embodiment and may be subjected to modifications within the scope of the following claims.

We claim:

1. Shock absorber (18) for a suspension element of a heavy vehicle, comprising a hollow body (19) adapted to communicate with a hydraulic fluid source and with a hydraulic chamber (7) of the element, this body being provided with elastic damping washers (45-46), characterised in that it comprises a hollow slide (29) slidably mounted in a fixed member (23) disposed in a sleeve (24) inside the body (19), separated from the latter by an annular gap (25) and having an opening which communicates with a conduit (10) opening into the hydraulic chamber (7), the fixed member (23) is mounted with clearance in the sleeve (24) and provided with radial ports (27) communicating with the interior (31) of the slide (29), which is biased against said member (23) by an elastic return member (32) bearing on the body, the slide (29) being arranged in such manner as to be capable of occupying alternately a first position in which it closes any communication between said annular gap (25) and the interior of the slide (29) when the suspension element is subjected to a low frequency oscillation, less than $\sqrt{2}$ times its frequency of resonance, and a second position in which it establishes a communication between its interior volume (31) and the annular gap (25) between the sleeve (24) and the body (19) when the suspension element is subjected to an oscillation frequency greater than $\sqrt{2}$ times its frequency of resonance.

2. Shock absorber according to claim 1, characterised in that a passageway (37), opening at one end onto an end surface of the slide (29), opposed to its return member (32), and having a jet (39), at its other end, is provided in the fixed member (23) so as to maintain under the slide a layer of hydraulic fluid capable of restraining the displacements of the slide.

3. Shock absorber according to claim 2, characterized in that the slide (29) has a first part (29B), on whose cross-section is exerted the hydraulic pressure transmitted by the jet (39), and a second part (29A) on whose cross-section acts the excitation pressure which comes from the hydraulic chamber (7) and which is the pressure of the hyudraulic fluid in the interior (31) of the slide, the cross-section of said first part being slightly smaller than the cross-section of said second part.

4. Shock absorber according to claim 2, wherein said jet (39) has a re-supply valve.

* * * * *